US012586916B2

(12) United States Patent
Mittleman et al.

(10) Patent No.: US 12,586,916 B2
(45) Date of Patent: Mar. 24, 2026

(54) LOCATION INFORMATION FROM A RECEIVER IN A WIRELESS NETWORK

(71) Applicants: Brown University, Providence, RI (US); William Marsh Rice University, Houston, TX (US)

(72) Inventors: Daniel Mittleman, Providence, RI (US); Edward Knightly, Houston, TX (US)

(73) Assignees: BROWN UNIVERSITY, Providence, RI (US); William Marsh Rice University, Houston, TX (US)

( * ) Notice: Subject to any disclaimer, the term of this patent is extended or adjusted under 35 U.S.C. 154(b) by 0 days.

(21) Appl. No.: 18/776,029

(22) Filed: Jul. 17, 2024

(65) Prior Publication Data

US 2024/0372265 A1 Nov. 7, 2024

Related U.S. Application Data

(62) Division of application No. 17/626,481, filed as application No. PCT/US2020/041364 on Jul. 9, 2020, now Pat. No. 12,074,370.

(60) Provisional application No. 62/873,633, filed on Jul. 12, 2019.

(51) Int. Cl.
*H01Q 13/22* (2006.01)
*H01Q 1/22* (2006.01)
*H01Q 21/28* (2006.01)

(52) U.S. Cl.
CPC .......... *H01Q 13/22* (2013.01); *H01Q 1/2291* (2013.01); *H01Q 21/28* (2013.01)

(58) Field of Classification Search
CPC ................ H01Q 1/2291; H01Q 1/246; H01Q 13/10–20; H01Q 13/22; H01Q 21/28–29
See application file for complete search history.

(56) References Cited

U.S. PATENT DOCUMENTS

| | | | | |
|---|---|---|---|---|
| 3,696,433 | A | 10/1972 | Killion et al. | |
| 5,726,666 | A | 3/1998 | Hoover et al. | |
| 6,995,724 | B2 | 2/2006 | Teshirogi et al. | |
| 9,788,269 | B2 * | 10/2017 | Gokhale | H04W 40/244 |
| 2011/0234338 | A1 | 9/2011 | Takahashi | |
| 2016/0119038 | A1 | 4/2016 | Thomas et al. | |
| 2017/0170540 | A1 | 6/2017 | Morgan et al. | |

FOREIGN PATENT DOCUMENTS

| | | | |
|---|---|---|---|
| WO | 2017133355 | A1 | 8/2017 |
| WO | 2017152411 | A1 | 9/2017 |
| WO | 2018048202 | A1 | 3/2018 |

OTHER PUBLICATIONS

"International Search Report and Written Opinion received for PCT Patent Application No. PCT/US2020/041364, mailed Oct. 1, 2020", 8 pages.

(Continued)

*Primary Examiner* — Hasan Islam
(74) *Attorney, Agent, or Firm* — K&L Gates LLP

(57) ABSTRACT

A multi-frequency wireless access device including a first waveguide having a pair of parallel metal plates with open sides and a slot in one of the metal plates, the slot permitting radiation to leak out, the leaked radiation illuminating a range of angles depending on frequency.

5 Claims, 7 Drawing Sheets

(56) References Cited

OTHER PUBLICATIONS

Karl, N , et al., “Frequency-division multiplexing In the terahertz range using a leaky-wave antenna”, Nature Photonics, vol. 9, <https://www.brown.edu/research/labs/mittleman/sites/brown.edu.research.labs.mittleman/files/uploads/nphoton.2015.176.pdf>., Nov. 2015, 5 pages.
McKinney , et al., “Focused terahertz waves generated by a phase velocity gradient in a parallel-plate waveguide”, Optical Society of America, vol. 23, No. 21, Oct. 15, 2015, 6 pages.

* cited by examiner

LOCATION INFORMATION FROM A RECEIVER IN A WIRELESS NETWORK

CROSS REFERENCE TO RELATED APPLICATIONS

This is a divisional application of U.S. patent application Ser. No. 17/626,481, filed Jan. 11, 2022, now U.S. Pat. No. 12,074,370, which is a national phase filing under 35 U.S.C. § 371 of International Application No. PCT/US2020/041364, filed Jul. 9, 2020, which claims benefit from U.S. Provisional Patent Application No. 62/873,633, filed Jul. 12, 2019, the entire contents of which are incorporated herein by reference.

STATEMENT REGARDING GOVERNMENT INTEREST

None.

BACKGROUND OF THE INVENTION

The present invention relates generally to wireless networks, and more particularly to location information from a receiver in a wireless network.

In general, terahertz wireless networking, colloquially known as "6G," is becoming an active area of research, spurred by the anticipated need for ever-increasing wireless capacity. This will be a very distinct sort of wireless network, in part because the signals propagate as narrow beams not wide-area broadcasts. This means that an access point (e.g., a wireless router or base station) needs to be aware of the location of receivers, in order to aim the signal correctly. This is quite distinct from all existing wireless systems, where 'aiming' is never an issue since broadcasts always cover a very wide angular range.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In general, in one aspect, the invention features a multi-frequency wireless access device including a first waveguide having a pair of parallel metal plates with open sides and a slot in one of the metal plates, the slot permitting radiation to leak out, the leaked radiation illuminating a range of angles depending on frequency.

In another aspect, the invention features a network including an access point having leaky waveguides, each one of the leaky waveguides having a pair of parallel metal plates with open sides and a slot in one of the metal plates, a first client system wirelessly communicative with the access point, and a second client system wirelessly communicative with the access point.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

These and other features, aspects, and advantages of the present invention will become better understood with reference to the following description, appended claims, and accompanying drawings where:

DETAILED DESCRIPTION

Figure 1:
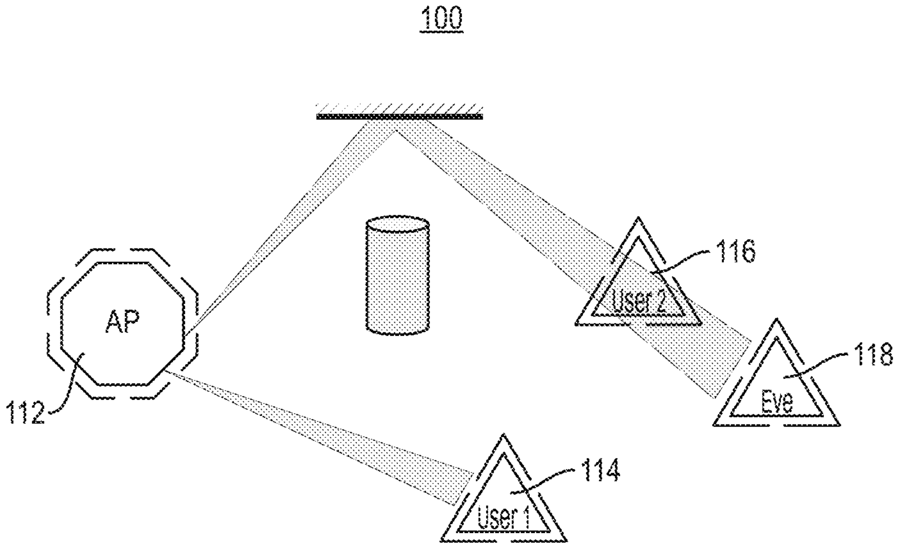
FIG. 1 is a block diagram of an exemplary architecture.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

Efficient coordination of spectral and spatial resources is a fundamental challenge in THz-scale networks with highly directional beams and vast bands of potential spectrum. As shown in FIG. 1, an exemplary architecture 10 is illustrated. The architecture 10 is a Leaky X-Agon architecture, a wide local area network (WLAN) that employs a leaky waveguide structure to enable efficiently discoverable THz-scale links with high spatial density. A traditional leaky waveguide has the property that an emission angle is coupled to the frequency of the input signal by a simple closed form and monotonic relationship. A THz-scale leaky waveguide yields both an opportunity and a challenge. The opportunity is virtually unlimited packing of simultaneous beams in a spatial area as both frequency and spatial and angular separation can be used to limit co-stream interference. The challenge is control and coordination: how to find, establish, and maintain highly directive links in an environment with frequency-angle coupling. As shown in FIG. 1, Leaky X-Agon architecture 10 fuses multiple leaky waveguides into a regular polygon structure. In one implementation using a modest number of emission faces (e.g., below 10), when combined with exploitation of specular reflected paths, yields a rich set of frequency-angle capabilities while retaining implementation simplicity.

More specifically, as shown in FIG. 1, the exemplary architecture 100 includes an 8-face Leaky X-Agon access point (AP) 112 and two 3-face clients 114, 116. The clients 114, 116 communicate with the AP 112 using different faces and angles, resulting in different frequencies. A strong adversary Eve 118, attempts to eavesdrop on the signal via either a reflection from a cylindrical object or by placing herself behind the client 116.

Exploiting the architectural components in FIG. 1, we realize a new paradigm in spectrum sensing, yielding efficient and coordinated access to THz-scale spectrum.

Namely, we designed the core mechanisms needed to find and adapt highly directional paths in real time. We realize high spatial density by exploiting high bandwidth and frequency-angle coupling to create many high-rate streams with little or no cross-talk. We created a "THz rainbow" by inputting a broadband signal to the leaky waveguide such that each frequency is emitted at a different angle, thus filling the entire angular sector with signal. In this way, receivers can discover which angular paths they are able to receive from, including both line of sight (LOS) and specular reflected paths. Both sender and transmitter can subsequently adapt their configuration to select the best face of the Leaky X-Agon as well as the best frequency, incorporating factors such as data rate, resilience, and interference.

One object of the Leaky X-Agon architecture 100 is that it provides the key building blocks for enabling efficient discovery of spatial and spectral resources above 100 GHz. In this spectrum, (i) narrow beam widths of several degrees can provide sufficient directivity gain to realize high data-rate links. (ii) Beams can be reflected off surfaces spanning from white boards to cinderblock walls, enabling multiple possible transmission paths, both LOS and NLOS. (iii) There is a plethora of spectrum available above 100 GHz. Together, these three features yield an abundance of transmission possibilities and the opportunity to densely pack many links into a limited spatial area.

The Leaky X-Agon architecture 100 is a fundamental building block for realizing THz-scale WLANs. The present invention uses THz rainbows emitted from the faces of the Leaky X-Agon in order to efficiently align beams and identify spatial, spectral, and frequency resources.

A leaky waveguide enforces a strict one-to-one relationship between the carrier frequency and the angle of emission (or reception) having maximum gain. As a result, beam steering (in one dimension) can be achieved by tuning the carrier frequency. In conventional wireless systems, such an idea would be impossible to implement, since the carrier frequency is typically fixed due to channelization standards and to the narrow band (and carefully tuned) design of RF components. However, the situation is quite different in the THz range with the availability of extremely broad channels. The effective utilization of such a broad spectral swath requires extremely broadband and frequency-agile RF components throughout the PHY layer. Thus, we employ the leaky waveguide as a key element for realizing a high efficiency and steerable THz-scale WLAN.

Figure 2:
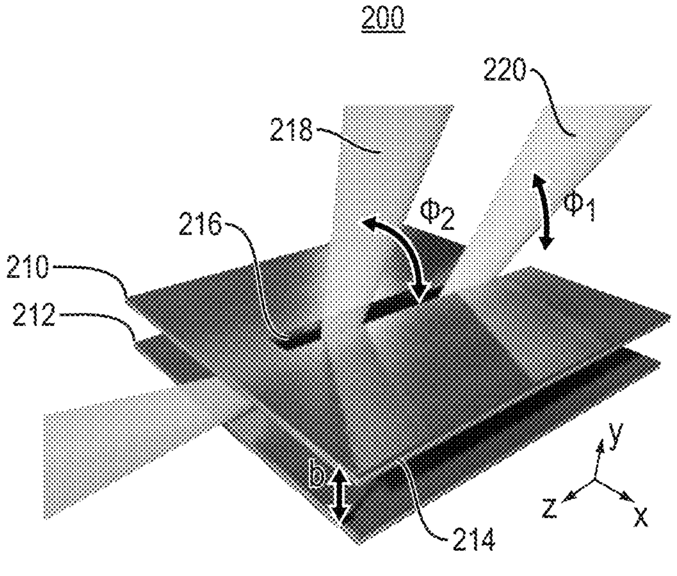
FIG. 2 is a diagram of an exemplary leaky waveguide.

As shown in FIG. 2, an exemplary leaky waveguide 200 includes a pair of parallel metal plates 210, 212 with open sides 214 with a slot 216 in one of the metal plates 210. Leaky waves emerge from the slot 216, and a free space wave 218 and a guided wave 220 must satisfy the phase-matching condition $k_0 \sin(\theta)=k_w$ where $k_0$ is the free-space wave vector, $k_w$ is the wave vector of the guided wave, and $\theta$ is the angle between the normal to the waveguide and the direction of free-space propagation. For the lowest transverse-electric mode of a parallel plate waveguide, this phase-matching constraint leads to a direct relationship between the angle of the emitted (or received) signal and its frequency:

$$\sin(\theta) = \sqrt{1 - \left(\frac{c}{2bf}\right)^2} \tag{1}$$

where where f is the carrier frequency, c is the free-space light speed, and b represents the distance between the two metal plates 210, 212. Other geometrical parameters, such as the width and length of the leaky-wave aperture, can impact the efficiency of energy transfer between the guided mode and free space, but not the angle (for a given frequency). Thus, one can expect a simple and monotonic relationship between frequency and angle, for both the case of a guided wave radiating into free space and the case of a free-space wave impinging on the device and coupling to a guided wave (i.e., for both transmission and reception of signals).

Figure 3:
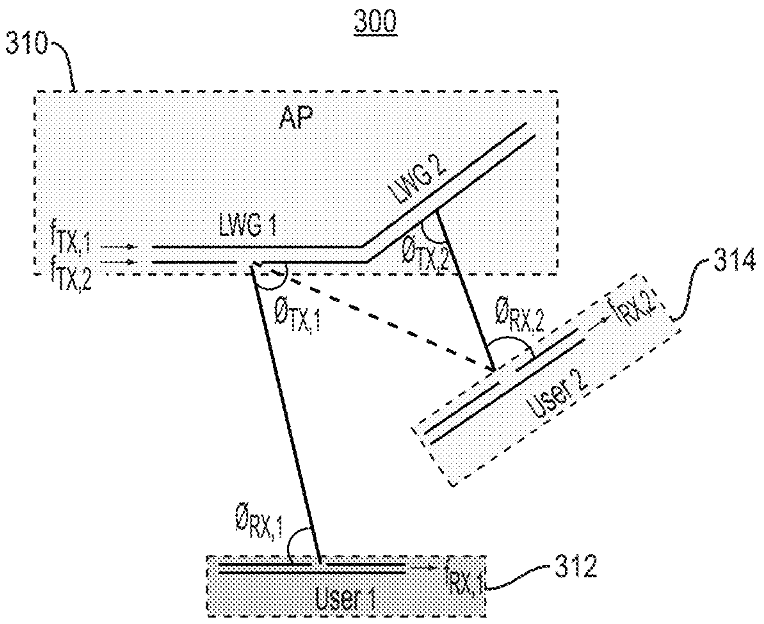
FIG. 3 is a diagram of an exemplary WLAN.

As shown in FIG. 3, an exemplary WLAN 300 includes an access point (AP) 310 and two clients 312, 314. If the AP 310 had only one leaky waveguide (e.g., LWG 1), then it would be able to serve client 312 efficiently as the emission angle ($\phi_{TX,1}$) is close to arrival angle ($\phi_{RX,1}$). However, that is not the case for client 314 as the large offset between $\phi_{TX,2}$ and $\phi_{RX,2}$ incurs significant coupling loss to the waveguide.

Hence, a key element of the Leaky X-Agon architecture is to employ multiple leaky waveguide faces to devices, in which each face is structured at a different angle and therefore provides additional opportunities for minimizing coupling loss due to angular mismatch. FIG. 3 shows a second leaky waveguide face which provides an additional such "best angle" for frequency-angle coupling to the receiver. Hence, when the AP 310 and client 312, 314 communicate, they can choose the best center frequency to maximize their data rate by minimizing the mismatch. Of course, the number of waveguide faces (sides of the "X-Agon") and their relative orientation depends on a number of inter-related factors: each additional face increases spectral efficiency by reducing angular-frequency mismatch. However, additional faces also have implications for control-plane design and complexity.

Figure 4:
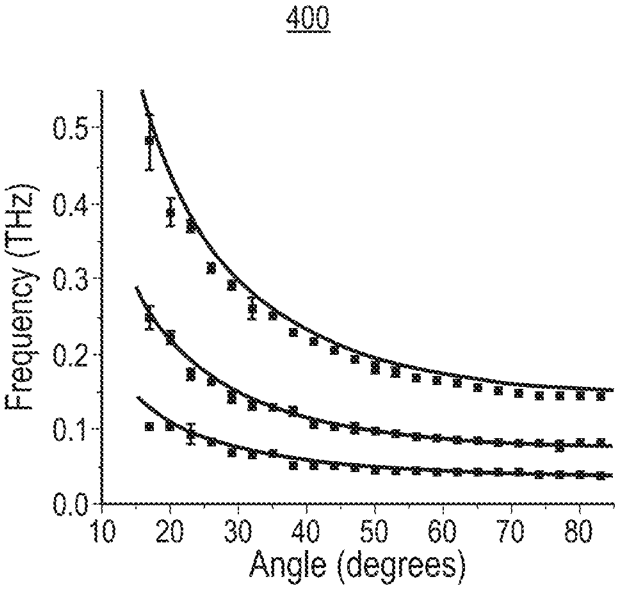
FIG. 4 is an exemplary graph.

The ability of THz-scale WLANs to realize highly directional beams at a diverse set of frequencies yields an unprecedented control-plane challenge: how to rapidly coordinate between sender and receiver, identifying the best spatial paths (LOS or reflected). Our idea is to exploit the properties of the leaky waveguide to realize a "THz rainbow" for identification of LOS and specular paths and to realize frequency selective beam steering. Namely, we exploited the leaky waveguide's properties to excite the transmitter's leaky waveguides using an ultra-broadband input signal. In this case, the output is a terahertz rainbow, with different frequencies simultaneously directed to different angles across the entire angular range. We exploit this capability as a foundational element for realizing a highly efficient control plane that can achieve high spatial density. Namely, because the entire space is filled with terahertz signals, at all frequencies within the bandwidth of the source; subsequently, when the receiver detects a signal at a particular frequency, then both the optimal transmit angle and the receiver orientation can be immediately determined, for the link defined by the detected frequency, using Eq. (1) above. While the received signal level may be diminished because the radiated power is distributed over a wide spectral/angular range, this is not necessarily a major concern, since the receiver only needs to identify the detected carrier frequency, not decode any data. FIG. 4 indicates that the angle-frequency coupling relationship in practice tightly follows Eq. (1). In FIG. 4, a graph 400 of the THz rainbow of radiation emitted from the leaky-wave slot is shown. The three curves represent results for three different values of the plate separation (from top to bottom: 1 mm, 2 mm, and 4 mm, respectively).

Figure 5:
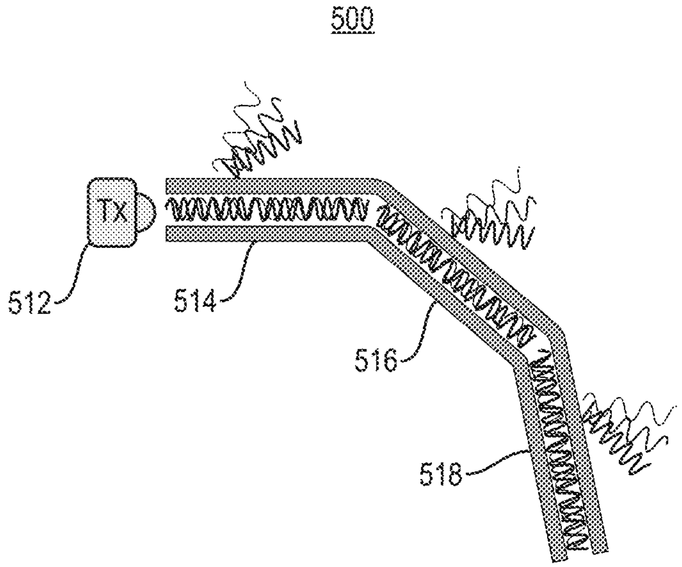
FIG. 5 is an exemplary Leaky X-Agon THz rainbow schematic.

As shown in FIG. 5, an exemplary Leaky X-Agon THz rainbow schematic 500 includes a single Tx 512, which excites several coupled waveguide segments 514, 516, 518 using a broadband signal in the THz range. Each segment 514, 516, 518 radiates a THz rainbow through a slot in the top waveguide plate.

Realizing a THz rainbow in a Leaky X-Agon (illustrated in FIG. 5) raises intriguing challenges. One important example concerns the overlap in the angular ranges covered by adjacent waveguide segments. This overlap could lead to an ambiguity for the client, who may not be able to tell from which segment a detected signal originated. This could lead to confusion in locating the client within the overall broadcast sector. This confusion arises because each segment broadcasts an identical rainbow to that of its neighbors (identical in angular spread and spectral content, though covering a different range of angles). To overcome this problem, we exploiting an additional degree of freedom in the leaky-wave device: the width of the leaky-wave slot.

Figure 6:
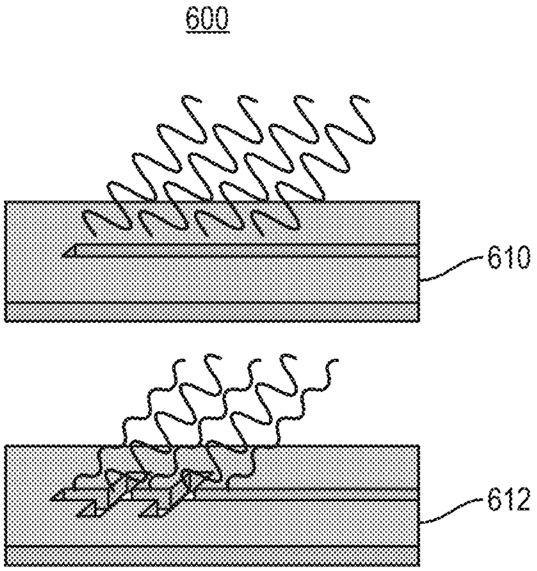
FIG. 6 is an exemplary schematic.

FIG. 6 illustrates an exemplary schematic 600 of two designs for the slot in the top plate of a leaky waveguide: uniform width so the radiation amplitude is constant along its length (upper 612) varying width, imposing an amplitude variation on the radiated wave, in the far field (lower 614). More specifically, the upper 612 shows a slot of uniform width, while the lower 614 shows a slot in which the width is modulated in a pre-defined way. As shown, this modulation would lead to a modulated intensity for the output wave in the far field (which is shown here only for one frequency rather than for the entire rainbow, for case of illustration purposes). This simple diagram fails to account for several factors including depletion of the guided wave signal as it propagates underneath the slot. Nevertheless, it is a useful illustration of the basic idea of imposing a unique "fingerprint" of the particular waveguide slot on the far-field signal. We propose that each of the faces in the Leaky X-Agon be constructed with a unique slot width profile, imposing a unique amplitude modulation signature on the far-field signal originating from that particular slot. In this fashion, a detector in the far field is able to distinguish which of the various segments gave rise to the detected signal. Thus, for each feasible LOS and NLOS path, this process can not only align the beams, but it can also identify the net spectral overlap (available bandwidth for data after accounting for alignment mismatch) and characterize interference on that spectrum (any energy not due to the rainbow's signature), both of which will impact the ultimate data rate.

The present invention demonstrates that the broad spectrum emitted from a leaky waveguide (LWG) enables a method for link discovery for an access point in a local area network (LAN), including both the angular location and the rotation angle of the mobile client (i.e., both angle of departure and angle of arrival). Angle of departure (AoD) information can be obtained from the frequency of the spectral peak of the signal received by the client. Client rotation (angle of arrival, AoA) can be determined from the high-frequency and low-frequency edges of the received spectrum. This information can be harvested rapidly, using a single pulse of broadband emission from the access point, and requires no information about the spectral phase of the received signal.

Figure 7A:
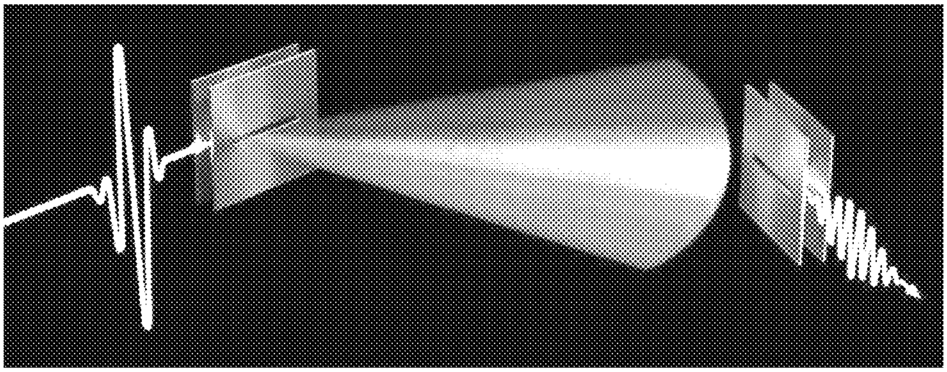
FIG. 7*a* illustrates an exemplary THz rainbow.
Figure 7B:
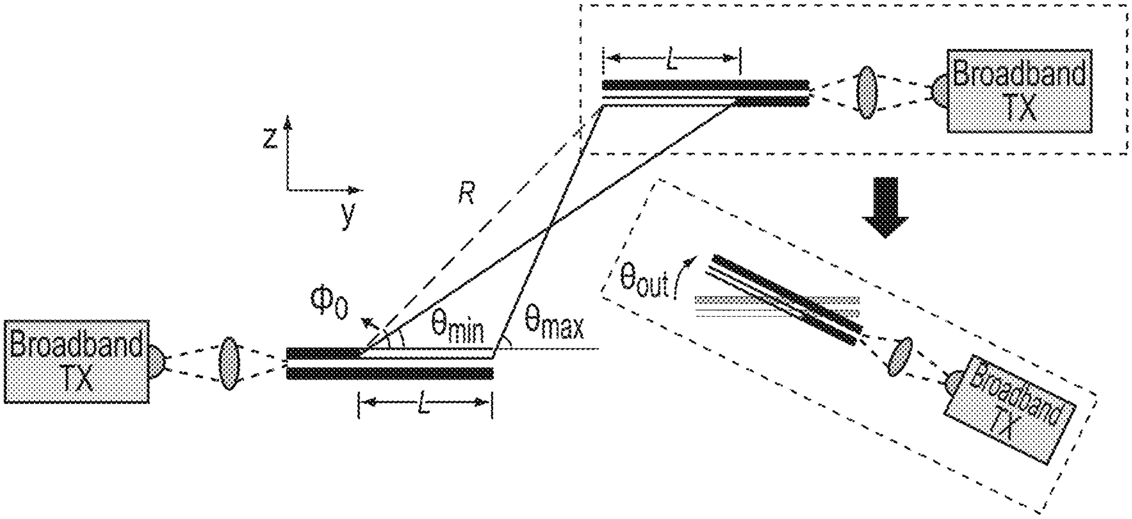
FIG. 7*b*. Illustrates an exemplary experimental arrangement.

Obtaining directional information is illustrated schematically in FIGS. 7*a* and 7*b*. Both the transmitter (e.g., access point) and the mobile receiver (client) are equipped with leaky-wave waveguides. The transmitter excites the $TE_1$ mode of the waveguide with a broadband source whose spectral coverage is broad enough to illuminate the entire relevant angular range, according to Eq. (2):

$$f(\phi) = f_c/\sin\phi \tag{2}$$

where $f_c$ is the waveguide cutoff frequency, given by $c_0/2b$ and $\phi$ is the propagation angle of the free space mode relative to the waveguide propagation axis. Here, b is the plate separation and $c_0$ is the vacuum light velocity.

The LWG fills the space with a range of frequencies, in the form of a THz "rainbow." If the client's waveguide is parallel to the transmitter's waveguide, then it is clear that a signal at a particular frequency will couple into the waveguide. However, if the client is rotated, then the two angles do not match. In this case, using the simple analysis of Eq. (2), one would expect that the client would receive no signal, even for a very small rotation away from perfectly parallel. This is why a more sophisticated analysis of the leaky-wave device is necessary; the spectrally broader emission at a specific angle enables a finite range of client rotation without complete loss of signal.

We can understand this broader spectral width in two ways. First, one can treat the leaky-wave slot as a finite-length aperture, which produces a diffraction pattern in the far field. In this case, the angular distribution of the diffracted field (in the plane of the slot) is given by:

$$|E(\phi)| = \mathrm{sinc}\left[(\beta - i\alpha - k_0 coz\phi)(L/2)\right], \tag{3}$$

where sinc (x)=sin (x)/x, $\beta$ is the wave vector of the $TE_1$ guided wave, $k_0=\omega/c$, L is the slot length, and $\alpha$ is a parameter which describes the loss of energy in the guided mode due to leakage out of the slot.

Alternatively, for a LWG with infinitely thin metal plates, the energy leakage is determined only by phase matching. However, for a plate of finite thickness, the slot itself acts as a waveguide, which presents an impedance boundary between the $TE_1$ fast wave and free space. Rays can reflect from this boundary, and remain in the waveguide for a longer propagation distance before leaking out. As illustrated in FIG. 7*b*, this results in a larger effective length for the emission region. From geometrical considerations, we derive the minimum and maximum angles at which a light ray could be received, as:

$$\theta_{min} = \tan^{-1}\left(\frac{k_t R}{k_y R + k_0 L}\right) \quad \theta_{max} = \tan^{-1}\left(\frac{k_t R}{k_y R - k_0 L}\right), \tag{4}$$

Here, R and L are defined in FIG. 7*b*, and $k_y$=the square root of $(k^2_0-k^2_z)$ and $k_z=\pi/b$ are the y and z components of the free-space wave vector, respectively. We assume an effective slot length L which is identical for both transmitter and receiver. We note that this ray optics approach makes sense only in the limit where the rate of emission is large, such that the loss parameter $\alpha$ satisfies $\alpha L>1$.

Figure 9A:
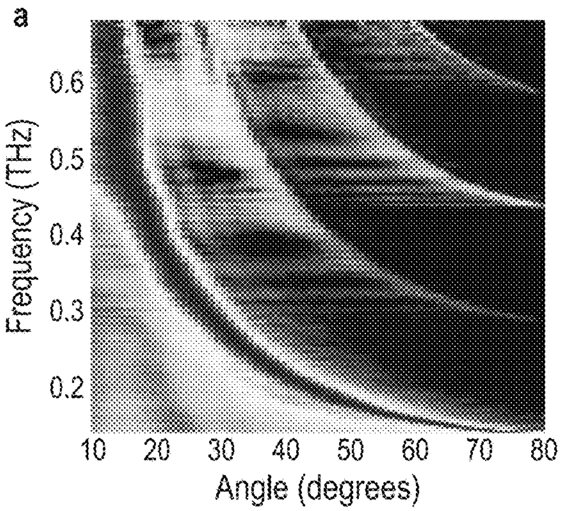
FIGS. 9*a* and 9*b* illustrate exemplary graphs.
Figure 9B:
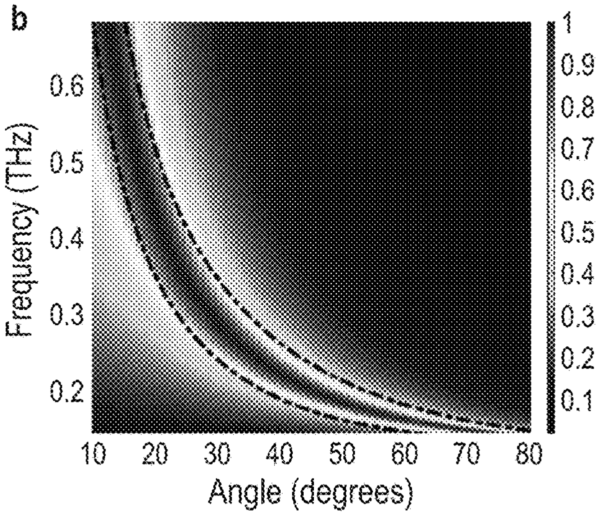

Both the diffraction formalism and the ray optics picture can be used to predict the spectral bandwidth of radiation emitted at any given angle from the leaky-wave slot, assuming that the waveguide is excited with a broadband input. FIG. 9*a*, 9*b* show their agreement with each other, and with results measured using the test-bed system described below. Since our approach to client location and rotation sensing described below relies only on determining the peak and upper and lower limits of the received spectrum, we rely on the ray optics approach (Eq. 4) for subsequent discussion.

Based on our results, we developed a method for locating a mobile receiver in the far field of the transmitter (access point). This receiver (client) can detect only portion of the THz rainbow. This subset of the transmitted spectrum contains information about the line-of-sight angle of the client relative to the access point. We focus on the spectral peak of the received signal and translate it to the corresponding angle using Eq. 2. Note that this approach does not require any prior knowledge other than the geometry of the LWG (i.e., the plate separation). Further, it requires only power measurements at the receiver and not phase information. This dramatically simplifies the THz node architecture, eliminating the need to keep tight synchronization between the transmitter and receiver, and is robust to small-scale channel variation.

To explore the effectiveness of this protocol, we have built scale-model test bed (illustrated in FIG. 7*b*) based on conventional terahertz time-domain spectrometer to provide access to a continuous broadband spectrum ranging from 100 GHz to over 1 THz, in the form of a short pulse. We note that this is a very low-power source25, so the transmission range of the test bed is limited to a few tens of cm. Clearly, with the higher power available from broadband emitters based on integrated devices26-28, a larger range could be achieved. Nevertheless, this test-bed setup is sufficient for demonstrating the efficacy of the new link discovery protocol described above. For our LWG, we use aluminum plates with a spacing of b=1.04 mm. We excite the $TE_1$ mode of this waveguide by quasi-optic coupling from focused Gaussian beam. For detection, a broadband receiver is located in the far field of the LWG output, staring directly at the emission point.

We measure the received spectrum for many different locations of the receiver, and extract an estimate of its angular location from these spectra. The results are summarized in FIG. 8, demonstrating an average estimation error of only a few degrees. The error increases somewhat for larger values of φ, because of the reduced variation of frequency with angle (sec FIG. 9*a*), and also because of the finite spectral resolution of our measurement system (about 3 GHz).

Figure 8:
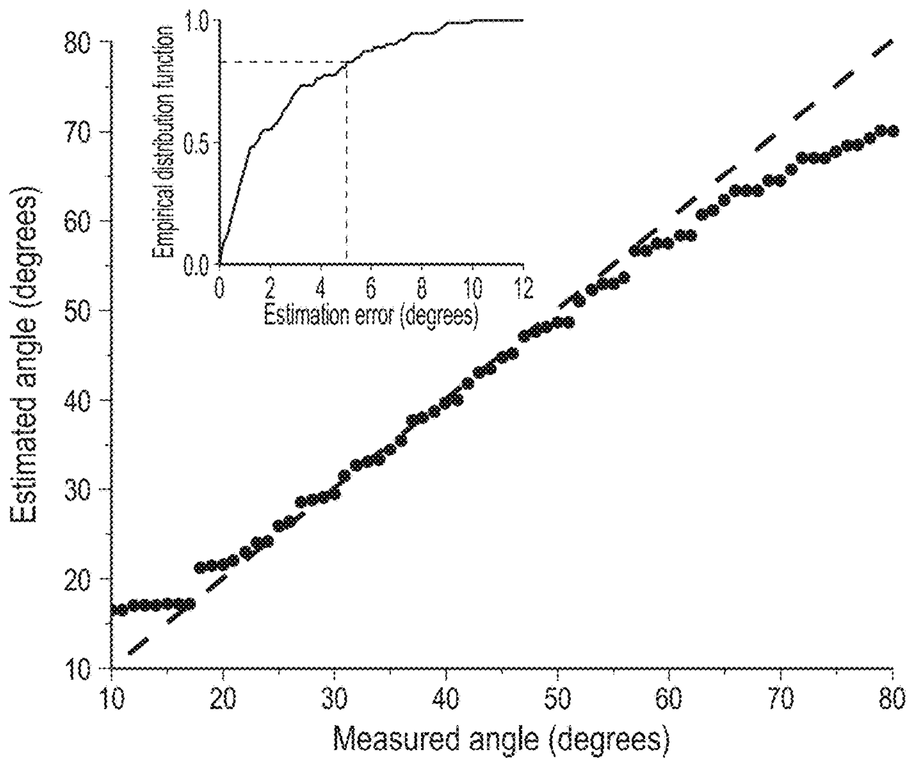
FIG. 8 illustrates an exemplary graph.

More specifically, FIG. 8 illustrates a graph showing the accuracy of single-shot angle-of-arrival extraction. The graph compares the angle of the client extracted from the peak frequency of the measured spectrum against the actual angle, which is obtained from physical measurement of the setup. Here, the spectra are obtained with a LWG at both the transmitter and receiver. The two waveguides are oriented parallel to each other, such that $\theta_{rot}=0$. The inset shows the empirical distribution function. The dashed lines indicate that the estimation error is less than 5° in more than 80% of measurement instances.

FIGS. 9*a* and 9*b* illustrate a spectrum of emitted radiation vs. emission angle. In FIG. 9*a*, a plot of the spectrum of the radiation emitted by a LWG at emission angle φ0, after excitation with a broadband input. This is measured using a broadband detector staring directly at the emission point, without a second LWG. Each row of this image has been normalized to unity magnitude, in order to remove the frequency-dependence of the input signal from the Thz-TDS transmitter, and emphasize the signals at higher frequency. The prominent arc in the lower left region corresponds to the emission from the dominant $TE_1$ waveguide mode; the weaker arcs in the upper right arise from higher-order TE waveguide modes ($TE_2$, $TE_3$, and $TE_4$), which result from imperfect input coupling to the waveguide. The $TE_1$ mode signal represents about 90% of the total radiated energy.

In FIG. 9*b*, two different predictions of the measured spectrum-angle relation displayed in FIG. 9*a* are shown.

We also use the spectral width of the received spectrum for estimating the rotation of the client. To explore this, we consider a client located at a particular angle $\varphi_0$ relative to the access point. In this case, we modify the detection by adding a LWG at the receiver in addition to the one at the transmitter (i.e., as illustrated in FIG. 7*b*). If these two waveguides are parallel, the AoD from the transmitter is equal to the AoA at the receiver. In this case, as discussed above, the low- and high-frequency edges of the spectrum are determined by $\varphi_0$. However, if the client is rotated by an angle $\theta_{rot}$, the AoA shifts by $\pm\theta_{rot}$ (+ for clockwise CW rotation, − for counterclockwise CCW rotation). Hence, for CW (CCW) rotation, the upper (lower) edge of the received spectrum shifts to lower (higher) frequencies. We find the magnitudes of these shifts are:

$$\frac{\partial f_{max}(\theta)}{\partial\theta}\bigg|\theta=\phi_0=\frac{f_{max}-f_{max,\theta_{rot}-0}}{\theta_{rot}}\ CW\text{case} \qquad (5)$$

$$\frac{\partial f_{min}(\theta)}{\partial\theta}\bigg|\theta=\phi_0=\frac{f_{min}-f_{min,\theta_{rot}-0}}{\theta_{rot}}\ CCW\text{case}.$$

Thus, we can extract the rotation angle from measurements of the high-and low-frequency edges of the spectrum.

Figure 10A:
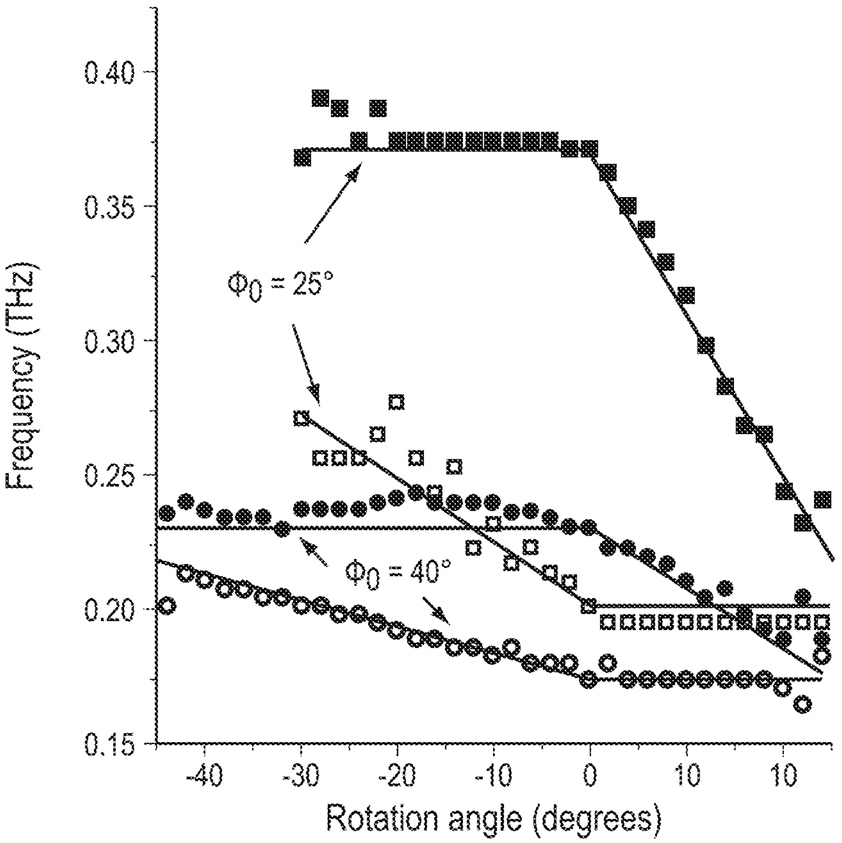
FIGS. 10*a*, 10*b*, and 10*c* illustrate exemplary graphs.
Figure 10B:
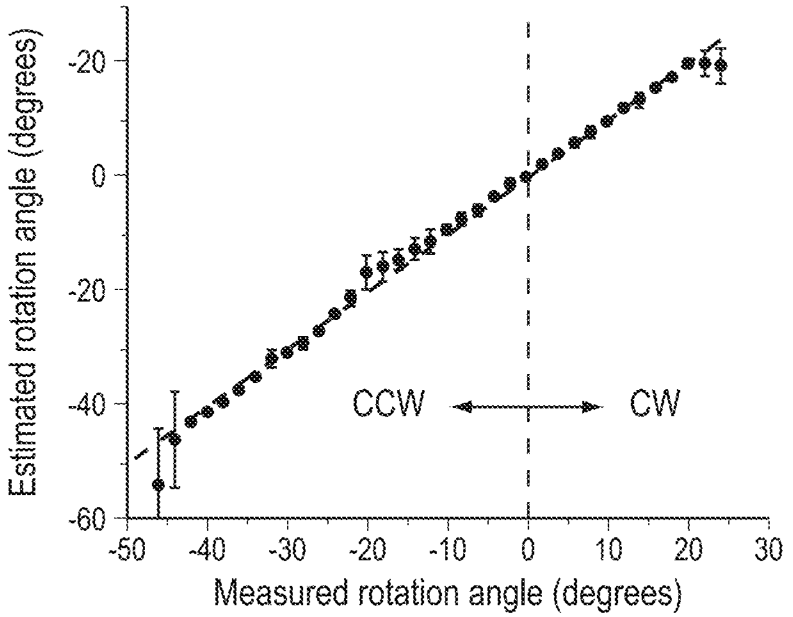
Figure 10C:
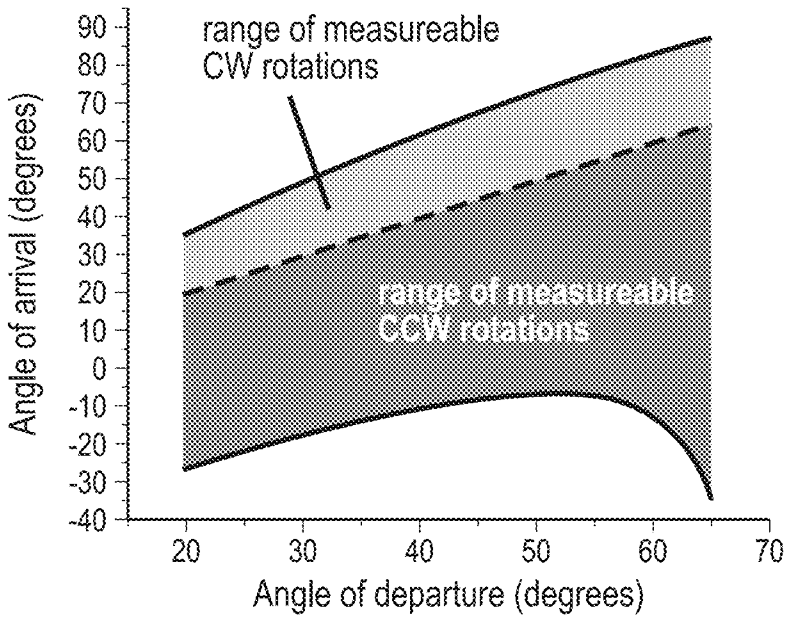

FIGS. 10*a*, 10*b* and 10*c* illustrate characterizations of client rotation. For a given angle at which the receiver (client) is located $\varphi_0$, we extract an estimate of the client's rotation angle $\theta_{rot}$, from the high-frequency ($f_{max}$) and low-frequency ($f_{min}$) edges of the measured spectra. In FIG. 10*a*, the extracted values of $f_{max}$ and $f_{min}$ as a function of client rotation angle, for two different values of $\varphi_0$. The solid lines represent the predicted values based on ray optics (Eq. 5). These results indicate the typical level of agreement between measurement and prediction, over the range of values of $\theta_{rot}$ where a nonzero spectral width is predicted by the theory.

In FIG. 10*b*, by compiling all measurements at a given rotation angle (at each $\varphi_0$), we extract the measurement uncertainty in the rotation angle as a function of the degree of rotation. The data points represent the average values of the extracted rotation angles at many values of $\varphi_0$; the error bars indicate the standard deviations of these averages. The uncertainty increases somewhat for larger rotations, since a smaller signal is measured for larger rotations. Nevertheless, over the range of accessible rotation angles, an average estimation error of less than 2° is obtained.

In FIG. 10*c*, from the ray optics theory, we can predict the maximum values of $\theta_{rot}$ which can be sensed for any given client location $\varphi_0$. This is not symmetric with respect to the direction of rotation (CW vs. CCW), because of the asymmetry of the emission configuration (i.e., $0<\varphi_0<90°$). However, a second transmitter, positioned on the opposite end of the LWG, would produce a symmetric emission pattern at angles $90°<\varphi_0<180°$, which would symmetrize the rotation sensing. Obviously, if the rotation angle $\theta_{rot}$ is too large, then no spectral information is received, and the rotation angle cannot be determined. However, for a surprisingly large range of angles (which depends on $\varphi_0$), rotation can be accurately tracked using a single-shot measurement. Once again, the average estimation error is in the range of just a few degrees.

Although the present invention has been described in terms of a preferred embodiment, it will be appreciated that various modifications and alterations might be made by those skilled in the art without departing from the spirit and scope of the invention.

What is claimed is:

1. A network comprising:

an access point comprising a plurality of leaky waveguides, each one of the plurality of leaky waveguides comprising a pair of parallel metal plates with open sides and a slot in one of the metal plates;

a first client system wirelessly communicative with the access point; and a second client system wirelessly communicative with the access point.

2. The network of claim 1, wherein the slot permits radiation to leak out.

3. The network of claim 2, wherein the leaked radiation illuminates a range of angles depending on frequency.

4. The network of claim 3, wherein the plurality of leaky waveguides are fused together at different angles with respect to each other.

5. The network of claim 4, wherein the fused leaky waveguides combined with exploitation of specular reflected paths yield a rich set of frequency-angle capabilities while retaining implementation simplicity.

* * * * *